United States Patent
Varkey et al.

(10) Patent No.: US 7,912,333 B2
(45) Date of Patent: Mar. 22, 2011

(54) DUAL CONDUCTOR FIBER OPTIC CABLE

(75) Inventors: Joseph Varkey, Sugar Land, TX (US); Vladimir Hernandez-Solis, Stafford, TX (US); Surya Simanjuntak, Houston, TX (US); Vadim Protasov, Houston, TX (US); Byong Jun Kim, Los Altos, CA (US); Jushik Yun, Sugar Land, TX (US); Jose Ramon Lozano-Gendreau, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 101 days.

(21) Appl. No.: 12/365,200

(22) Filed: Feb. 4, 2009

(65) Prior Publication Data

US 2009/0196557 A1    Aug. 6, 2009

Related U.S. Application Data

(60) Provisional application No. 61/063,627, filed on Feb. 5, 2008.

(51) Int. Cl.
*G02B 6/44*    (2006.01)
(52) U.S. Cl. ......................................... 385/101; 385/102
(58) Field of Classification Search .................. None
See application file for complete search history.

(56) References Cited

U.S. PATENT DOCUMENTS

| | | | |
|---|---|---|---|
| 2,604,509 A | 7/1952 | Blanchard | |
| 3,115,542 A | 12/1963 | Palandri et al. | |
| 3,217,083 A | 11/1965 | Gore | |
| 4,131,757 A | 12/1978 | Felkel | |
| 4,131,758 A | 12/1978 | Felkel | |
| 4,183,621 A | 1/1980 | Kao | |
| 4,375,313 A | 3/1983 | Anderson | |
| 4,504,112 A * | 3/1985 | Gould et al. | 385/102 |
| 4,522,464 A | 6/1985 | Thompson | |
| 4,523,804 A | 6/1985 | Thompson | |
| 4,524,436 A | 6/1985 | Hall | |

(Continued)

FOREIGN PATENT DOCUMENTS

EP     0853249 A1    7/1998

(Continued)

OTHER PUBLICATIONS

S.M. Lebedev, O.S. Gefle, Yu.P.Pokholkov and V.I. Chichikin, "The Breakdown Strength of Two-Layer Dielectrics", Tomsk Polytechnic University, Tomsk, Russia, #4.304.P2, High Voltage Engineering Symposium, Aug. 22-27, 1999.

(Continued)

*Primary Examiner* — Tina M Wong
(74) *Attorney, Agent, or Firm* — Michael L. Flynn; David Hofman; Jody Lynn Destefonis

(57) ABSTRACT

A powered fiber optic cable for use in a hydrocarbon well of extensive depth and/or deviation. The cable may couple to a downhole tool for deployment to well locations of over 30,000 feet in depth while maintaining effective surface communication and powering of the tool. The cable may be configured to optimize volume within a core thereof by employing semi-circular forward and return power conducting portions about a central fiber optic portion. As such, the cable may maintain a lightweight character and a low profile of less than about 0.5 inches in diameter in spite of powering requirements for the downhole tool or the extensive length of the cable itself.

26 Claims, 4 Drawing Sheets

U.S. PATENT DOCUMENTS

| | | | |
|---|---|---|---|
| 4,563,757 A | 1/1986 | Decorps |
| 4,575,831 A | 3/1986 | Decorps |
| 4,645,298 A | 2/1987 | Gartside, III |
| 4,675,474 A | 6/1987 | Neuroth |
| 4,696,542 A | 9/1987 | Thompson |
| 4,705,353 A | 11/1987 | Wagoner |
| 4,979,795 A | 12/1990 | Mascarenhas |
| 5,115,485 A | 5/1992 | Gandy |
| 5,202,944 A | 4/1993 | Riordan |
| 5,329,605 A | 7/1994 | Wargotz |
| 5,431,759 A | 7/1995 | Neuroth |
| 5,495,547 A | 2/1996 | Rafie |
| 6,009,216 A | 12/1999 | Pruett |
| 6,030,255 A | 2/2000 | Konishi |
| 6,060,662 A | 5/2000 | Rafie |
| 6,192,983 B1 | 2/2001 | Neuroth |
| 6,195,487 B1 | 2/2001 | Anderson |
| 6,211,467 B1 | 4/2001 | Berelsmann et al. |
| 6,260,656 B1 | 7/2001 | Orban |
| 6,281,489 B1 | 8/2001 | Tubel |
| 6,392,151 B1 | 5/2002 | Rafie |
| 6,400,873 B1 | 6/2002 | Gimblet |
| 6,403,889 B1 | 6/2002 | Mehan |
| 6,531,694 B2 | 3/2003 | Tubel |
| 6,555,752 B2 | 4/2003 | Dalrymple |
| 6,600,108 B1 | 7/2003 | Mydur |
| 6,621,964 B2 * | 9/2003 | Quinn et al. | 385/105 |
| 6,714,708 B2 | 3/2004 | McAlpine |
| 6,727,828 B1 | 4/2004 | Malone |
| 6,779,927 B2 | 8/2004 | Cens |
| 7,119,283 B1 | 10/2006 | Varkey |
| 7,140,435 B2 | 11/2006 | Defretin |
| 7,170,007 B2 | 1/2007 | Varkey |
| 7,188,406 B2 | 3/2007 | Varkey |
| 7,208,855 B1 * | 4/2007 | Floyd | 310/71 |
| 7,235,743 B2 | 6/2007 | Varkey |
| 7,259,331 B2 | 8/2007 | Sridhar |
| 7,288,721 B2 | 10/2007 | Varkey |
| 7,294,787 B2 | 11/2007 | Varkey |
| 7,324,730 B2 | 1/2008 | Varkey |
| 7,326,854 B2 | 2/2008 | Varkey |
| 7,402,753 B2 | 7/2008 | Varkey |
| 7,462,781 B2 | 12/2008 | Varkey |
| 7,465,876 B2 | 12/2008 | Varkey |
| 2003/0081917 A1 * | 5/2003 | Bussear | 385/101 |
| 2004/0045735 A1 | 3/2004 | Varkey |
| 2004/0262027 A1 | 12/2004 | Kaczmarski |
| 2006/0045442 A1 | 3/2006 | Varkey |
| 2006/0193572 A1 * | 8/2006 | Mjelstad | 385/101 |
| 2006/0280412 A1 | 12/2006 | Varkey |

FOREIGN PATENT DOCUMENTS

| | | |
|---|---|---|
| GB | 2275953 | 9/1994 |
| JP | 547186 | 1/1979 |
| JP | 2216710 | 8/1990 |
| WO | 9641066 | 12/1996 |
| WO | 9948111 | 9/1999 |
| WO | 0005612 | 2/2000 |
| WO | 2006131871 A2 | 12/2006 |

OTHER PUBLICATIONS

M.M.A Salama, R.Hackman, Fellow and A.Y. Chikhani, Sr., "Instructional Design of Multi-Layer Insulation of Power Cables", Transaction on Power Systems, vol. 7, No. 1, Fb. 1992, pp. 377-382.

* cited by examiner

DUAL CONDUCTOR FIBER OPTIC CABLE

CROSS REFERENCE TO RELATED APPLICATION

This Patent Document claims priority under 35 U.S.C. §119(e) to U.S. Provisional Application Ser. No. 61/063,627, entitled Small-Diameter, Lightweight, High Electrical Power, Easily Sealed Cable with Fiber-Optic Telemetry, filed on Feb. 5, 2008, which is incorporated herein by reference in its entirety.

FIELD

The statements in this section merely provide background information related to the present disclosure and may not constitute prior art.

Embodiments described relate to application cables for disposing in hydrocarbon wells. In particular, embodiments of cables are described for use in highly deviated wells and/or deep wells, for example, exceeding about 30,000 feet in depth. Cables as described herein may be employed for communicating with downhole tools and positioning them at such extreme well depths. Power transfer and telemetry over the cable may be achieved effectively and in a manner substantially avoiding cable damage during the application in spite of the deviated nature of the well or the extreme depths involved.

BACKGROUND

The statements in this section merely provide background information related to the present disclosure and may not constitute prior art.

Exploring, drilling, completing, and operating hydrocarbon and other wells are generally complicated, time consuming, and ultimately very expensive endeavors. Thus, in order to maximize hydrocarbon recovery from underground reservoirs, hydrocarbon wells are becoming of increasingly greater depths and more sophisticated. For example, wells exceeding 25,000 feet in depth which are highly deviated are becoming increasingly common.

Furthermore, in recognition of the expenses involved in completing and operating such hydrocarbon wells, added emphasis has been placed on well access, monitoring and management throughout its productive life. Ready access to well information and intervention may play critical roles in maximizing the life of the well and total hydrocarbon recovery. As a result, downhole tools are frequently deployed within a given hydrocarbon well throughout its life. These tools may include logging tools to acquire data relative to well conditions, intervention tools to address downhole conditions, and even downhole conveyance mechanisms such as downhole tractors to aid in achieving access to downhole portions of the well which may otherwise be potentially inaccessible.

The above noted downhole tools may be delivered to a downhole location in the well by way of a cable run from the surface of the oilfield. Thus, in order to provide the tools with power and telemetry capabilities, the cable may be configured with conductors and appropriate telemetric features. For example, circumferential forward and return paths of copper may be employed throughout the length of the cable to provide powering and communicative capacity to the downhole tool.

Sizing for the above noted conductors and telemetric features generally increases as the well depth or degree of deviation increases. For example, where the well is of significant deviation, a tractor requiring a significant amount of power may be employed to provide adequate downhole well access. As such, conductor sizing may be increased to help ensure delivery of sufficient power for the tractor. Similarly, in the case of extended reach wells, larger conductors may be employed which offer lower resistance for effective power transmission over greater distances. Furthermore, increases in size for the sake of improved telemetry may also be employed.

Unfortunately, increasing the size of conductors or telemetric features may pose significant drawbacks. For example, as a practical matter, an increase in sizing of cable features also increases the overall weight and profile of the cable. In terms of the increased weight, added load may be imparted on the cable, particularly nearer the oilfield surface. As such, the cable may be susceptible to damage under the stress of its own weight. In terms of an increase in cable profile, adequate sealing for cable deployment in high pressure wells may be compromised. That is, during the manufacturing process sealing sufficient for exposure of the cable to wells exceeding about 5,000 psi may be more of a challenge to attain as the cable profile increases.

In order to overcome the physical challenges posed by larger cables, attempts have been made to deliver such cables via drill pipe. That is, these fatter, heavier cables may be secured to and supported by a drill pipe for deployment into wells of extended depths and/or challenging access. Unfortunately, however, this manner of delivery presents its own set of drawbacks. For example, drill pipe delivery is a very inefficient mode of deployment. It may take about 3 to 4 days to deliver a cable in this manner to the depths of a well exceeding about 30,000 feet. Furthermore, the risk of damage to the cable due to its increased load is replaced with a risk of damage posed by the drill pipe itself. Additionally, delivery via a drill pipe fails to address sealing concerns with the larger profile cable.

For a variety of reasons as noted above, the use of downhole cables exceeding 30,000 feet is generally considered impractical for hydrocarbon well applications, particularly where the wells are of a deviated nature. Whether a matter of load, telemetry, or power limitations, cables substantially exceeding 30,000 feet or so generally remain unavailable and impractical, thereby limiting the effective monitoring and operating of wells exceeding such depths.

SUMMARY

A hydrocarbon application cable is provided with a fiber optic core. The cable may include a forward power conductor portion that is positioned adjacent a first side of the fiber optic core. A return power conductor portion may then be positioned adjacent an opposite side of the fiber optic core.

Alternatively, the central fiber optic portion is one of a unitary fiber and fiber optic bundles. The fiber optic bundles may be suspended in a silicone polymer media of the fiber optic portion. Alternatively, the cable further comprises electrically insulating encasings about the conductor portions that may include a material selected from a group consisting of a fluoropolymer, a polyolefin, a polyarylether ketone, a polyphenylene, and an elastomer. The electrically insulating encasings may be configured to define a distance between the conductor portions at interfaces thereof. The cable may further comprise a fluoropolymer jacketing layer about the electrically insulating encasings and conductor portions. The fluoropolymer may be a modified ethylene-tetrafluoroethylene.

Alternatively, the conductor portions are of an arcuate morphology that is one of half-circular and truncated circular. The cable may further comprise electrically insulating encasings about the conductor portions, the half-circular morphology providing an oval character to the encased conductor portions when interfacing about the central fiber optic portion. The cable may further comprise a polymeric layer of non-uniform thickness about the encased conductor portions to induce circularity into the cable. The polymeric layer may be of greater thickness adjacent the interfacing.

Alternatively, the cable further comprises a polymeric layer about the conductor portions, the polymeric layer of a material selected from a group consisting of a polyolefin, a fluoropolymer, a polyphenylene, and an epoxy. The cable may further comprising armor wire embedded about the polymeric layer. The polymeric layer may further comprise one of reinforcing fibers and micron sized reinforcing additives. Alternatively, the cable further comprises polymeric shells about the conductor portions, the polymeric shells of a material selected from a group consisting of a polyolefin, a polyarylether ketone, a fluoropolymer, a polyphenylene, and an epoxy. The polymeric shells may be reinforced by fibers that are one of carbon, glass, and an aramid. The cable may further comprise a polymeric tape about the polymeric shells, the polymeric tape being one of a fluoropolymer, a polyolefin, a polyarylether ketone, and a polyphenylene. The cable may further comprise an outer layer of austenitic nickel-chromium-based superalloy about the polymeric tape.

Alternatively, the conductor portions are configured of one of unitary copper and bundles of conductors. The cable may further comprise a polymeric tape about the bundles of conductors, the polymeric tape being of a material selected from a group consisting of a fluoropolymer, a polyolefin, a polyarylether ketone, and a polyphenylene.

In an embodiment, a cable assembly for a hydrocarbon application comprises a hydrocarbon application cable with a central fiber optic portion for telemetry surrounded by semi-circular forward and return conductor portions for power, a downhole tool coupled to the hydrocarbon application cable for positioning downhole in a well. Alternatively, the hydrocarbon application cable is in excess of about 30,000 feet. Alternatively, the hydrocarbon application cable is less than about 0.5 inches in diameter. Alternatively, the well is of a pressure of more than about 5,000 psi and the hydrocarbon application cable is sufficiently sealed for exposure thereto. Alternatively, the fiber optic portion is configured to provide well diagnostic information throughout a length of the hydrocarbon application cable. Alternatively, the power is in excess of about 0.5 kW and the downhole tool is a tractor.

In an embodiment, a method of manufacturing a hydrocarbon application comprises providing a central fiber optic portion for telemetric capacity, and positioning semi-circular forward and return power conductor portions about the fiber optic portion for powering capacity. Alternatively, the method further comprises encasing the conductor portions in electrically insulating polymer material prior to the positioning, and sealing the conductor portions with a jacketing material after the positioning. Alternatively, the method further comprises extruding a polymer layer about the underlying conductor portions, and imbedding reinforcing members in the polymer layer.

DETAILED DESCRIPTION

Embodiments are described with reference to certain downhole applications taking place at extensive well depths of a deviated nature. For example, diagnostic applications taking place in deviated wells in excess of 30,000 feet are described herein. However, hydrocarbon well applications employing embodiments of extended length cable assemblies as described herein may effectively proceed at shallower depths or in substantially vertical wells. The term "depth" is used herein to generally describe the distance from the surface of an oilfield to a downhole location in a well. This may include vertical depth in a conventional sense, as well as distances through non-vertical portions of the well. Regardless, embodiments described herein generally include a core having a central fiber optic portion surrounded by two conductor portions. The conductor portions are oriented about the fiber optic portion in a manner enhancing overall communicative and powering capacity per unit area of the cable.

Figure 1:
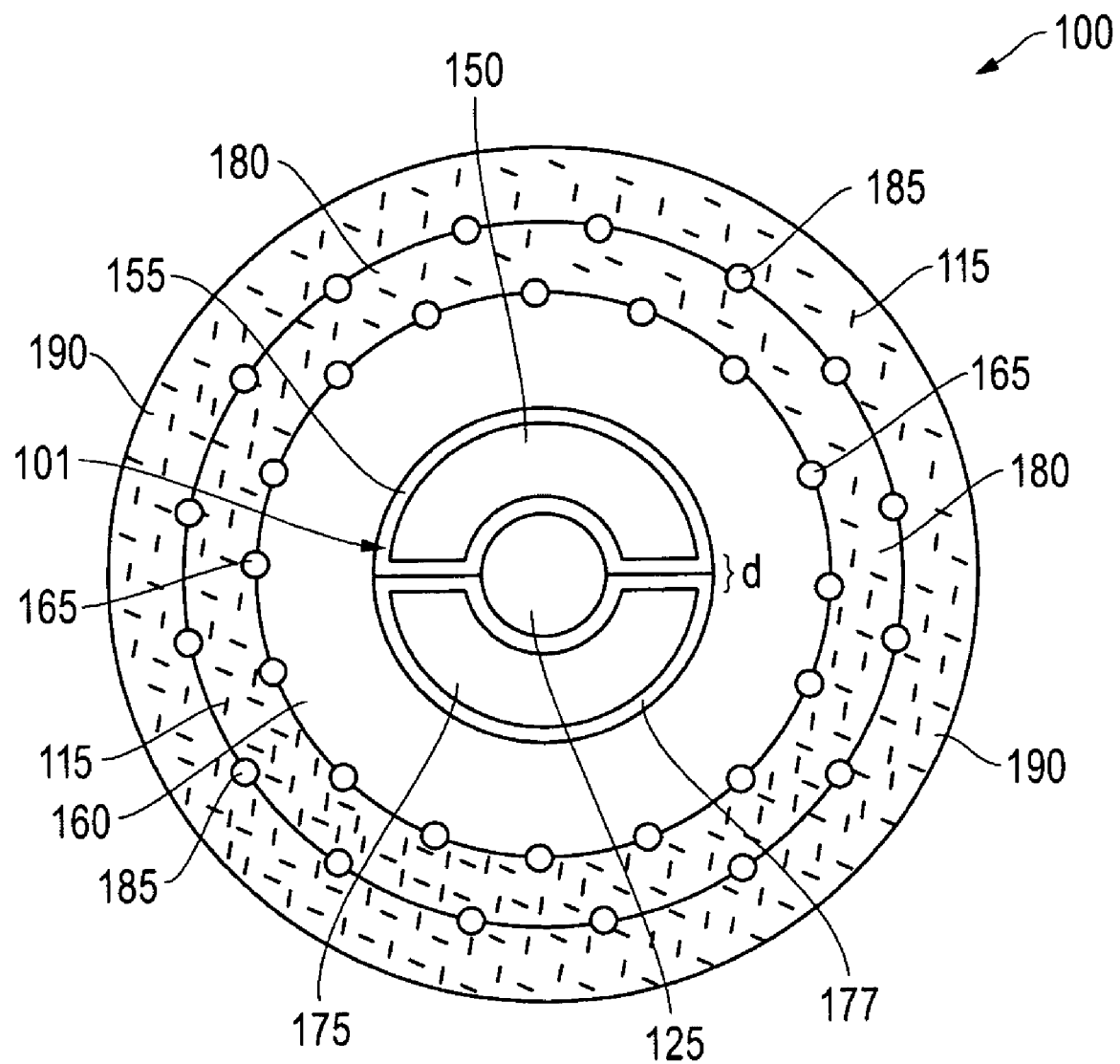
FIG. 1 is a side cross-sectional view of an embodiment of a dual conductor fiber optic cable.

Referring now to FIG. 1, a side cross-sectional view of an embodiment of a dual conductor fiber optic cable 100 is shown. The cross-sectional depiction of FIG. 1 is taken from 1-1 of FIG. 3 where the cable 100 is disposed within a well 380 of extensive depth and deviation. Nevertheless, as detailed herein the configuration of the cable 100 is such that adequate power and communicative capacity is provided to downhole tools 390, 395. Furthermore, this is achieved in a manner that avoids any substantial increase in load or cable profile. Thus, deployment of the cable 100 to depths in excess of 30,000 feet may be feasible without significant risk of catastrophic damage to the cable itself due to cable weight or sealing issues.

Continuing with reference to FIG. 1, the cable 100 is equipped with a core 101 that is particularly configured to enhance the utilization of space per unit area in terms of powering and communicative features. In this manner, the overall profile and weight of the cable 100 may be kept to a minimum thereby bolstering the strength to weight thereof. As such, deployment of the cable 100 to greater depths may be more practical. This enhanced utilization of space is provided by particular configurations of the core 101 as described below.

The core 101 is made up of a central fiber optic portion 125 for two way communication that is circumferentially surrounded by conductor portions 150, 175 for sake of providing power through the cable 100. That is, one conductor portion 150 may serve as a forward power conductor whereas the other conductor portion 175 may serve as a return power conductor. With particular regard to communicative capacity, the core 101 takes advantage of the fact that employment of a central fiber optic portion 125 may involve the use of a single thin unitary fiber that is sufficient for providing the cable 100 with two way communication, even over extreme distances.

At the same time, the remainder of the volume of the core 101 is primarily occupied by powering features in the form of the conductor portions 150, 175. The separate conductor portions 150, 175 are not positioned circumferentially in series about the fiber optic portion 125, for example, as with a more conventional core 101. Rather, the conductor portions 150, 175 take the form of a substantially semi-circular arcuate shape and are oriented immediately adjacent the fiber optic portion 125. Nevertheless, this orientation keeps interfacing between the conductor portions 150, 175 to a minimum as described further below. Thus, a reduction in the amount of electrical insulation between the forward 150 and return 175 conductor portions may be employed. This may be the case even where the size of the conductor portions 150, 175 is increased to deal with extensive cable depth and/or powering requirements. As such, the overall volume of the core 101 is kept to a minimum without sacrifice to powering capacity. Indeed, on a per unit area basis, the communicative and powering capacity of the cable 100 may be enhanced by the configuration of the core 101 as described. In the case of the conductor portions 150, 175, the use of semi-circular shapes allows two conductors to fit in a space that might otherwise be occupied by a single conductor of fair thickness.

Continuing with reference to FIG. 1, each conductor portion 150, 175 is electrically insulated with an encasing 155, 177 of polymer suitable for extrusion about the arcuate shape of the conductor portions 150, 175. For example, each encasing 155, 177 may be made up of a fluoropolymer, polyolefin, polyarylether ketone, polyphenylene, and/or an elastomer of a soft or thermoplastic variety. Of particular note is the fact that by employing separate semi-circular conductor portions 150, 177, the encasings 155, 177 interface one another at only two locations (e.g. at either side of the fiber optic portion 125). Thus, from a voltage rating perspective, electrical insulation concerns are substantially limited to these locations. Once more, even at these locations, it so happens that the amount of insulating is doubled as noted by the distance (d) between the interfacing conductor portions 150, 175. Thus, the nature of the core configuration is such that electrical insulating is advantageously present to a greater degree at locations of greater effectiveness.

Outside of the core 101, a host of additional layers 160, 180, 190 that are polymeric and/or reinforcing in nature may be provided. Also incorporated may be reinforcing members 165, 185 and/or fibers 115. In the embodiment of FIG. 1, the core 101 is initially jacketed by a fluoropolymer such as modified ethylene-tetrafluoroethylene. Subsequent layers 160, 180, 190 may then be successively formed as detailed below. Each of these layers 160, 180, 190 may be of a polyolefin, fluoropolymer, polyphenylene, an epoxy, or mixtures thereof. In the case of epoxy, a high temperature crosslinked epoxy may be employed.

In the embodiment shown, the intermediate 180 and outer 190 polymeric layers have reinforcing fibers 115 incorporated therein, whereas the inner polymeric layer 160 does not. However, in other embodiments, fibers 115 may be found in the inner polymeric layer 160. Regardless, the fibers 115 may be of carbon, glass, aramid or other suitable material. Other reinforcing additives may also be incorporated into the various layers 160, 180, 190 such as micron sized polytetrafluoroethylene, graphite, or polyphenylene sulfone based materials. Furthermore, as detailed below with reference to FIG. 2A, reinforcing members 165, 185 may be incorporated between the polymeric layers 160, 180, 190 during manufacture of the cable 100.

Ultimately, as detailed further below, the completed cable 100 may include effective telemetric capacity over distances exceeding about 30,000 feet. Additionally, power in excess of about 0.5 kW may be delivered over the cable 100 for such distances. Indeed, over about 1 kW may be delivered. Furthermore, in one embodiment, such powering and telemetric capacities may be present over distances exceeding 50,000 feet. Such powering and telemetric capacities may be made possible by the utilization of embodiments of a core 101 as detailed herein. Furthermore, from a physical standpoint, the cable 100 may be of a sufficiently narrow profile and effectively sealed during manufacture for use in high pressure applications. For example, the cable 100 may be sufficiently sealed for exposure to wells exceeding about 5,000 psi near surface without any significant pressure induced damage thereto.

Figure 2A:
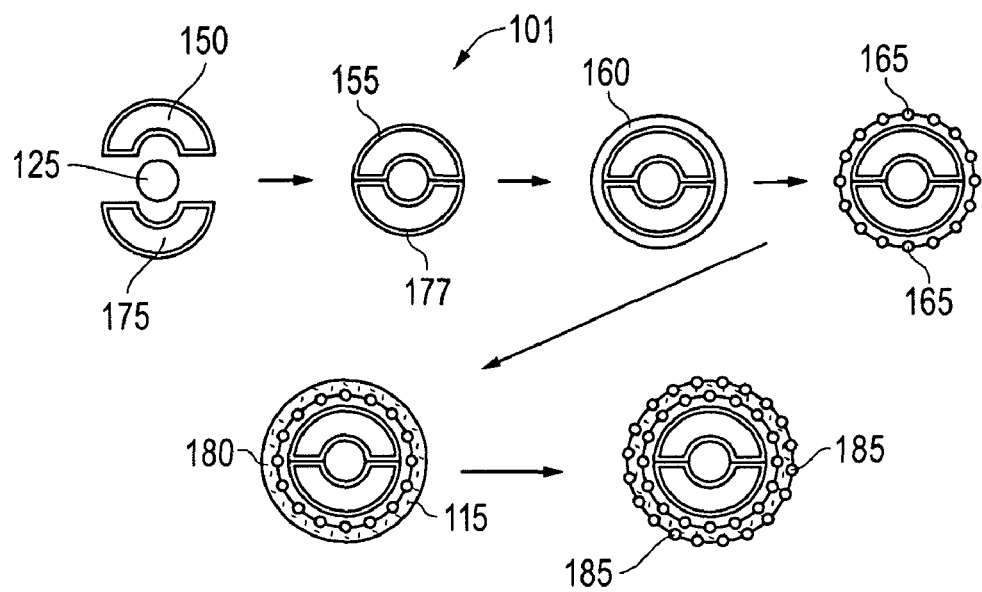
FIG. 2A is a schematic representation of an embodiment of manufacturing the dual conductor fiber optic cable of FIG. 1.

Continuing now with reference to FIG. 2A, a schematic view of manufacturing the cable 100 of FIG. 1 is depicted. As shown, a central fiber optic portion 125 is encompassed by separate forward 150 and return 175 conductor portions of unitary configuration. These portions 150, 175 may be of copper or other suitable material and thus, include electrically insulating polymeric encasings 155, 177 thereabout. As to the fiber optic portion 125, it is a single strand of fiber optic material. However, in other embodiments, bundled strands of fiber optics may be employed as detailed below. Further, once the forward 150 and return 175 conductor portions adjoin about the fiber optic portion 125, a jacketing polymer such as a fluoropolymer may be provided to encase a unitary core 101.

The inner polymeric layer 160 may be extruded about the core 101 with inner reinforcing members 165, then wound thereabout. As shown, the reinforcing members 165 may be provided with the polymeric layer 160 in a heated condition to allow for a degree of imbedding thereof into the layer 160. An intermediate polymer layer 180 with reinforcing fibers 115 may then be extruded about the underlying inner layer 160 and reinforcing members 165. Similarly, though, outer reinforcing members 185 may be provided about the intermediate polymeric layer 180 during heating thereof to allow for a degree of embedding of the members 185. Thus, upon extrusion of the outer polymeric layer 190 of FIG. 1, the outer reinforcing members 185 may be disposed between the intermediate 180 and outer 190 layers.

Figure 2B:
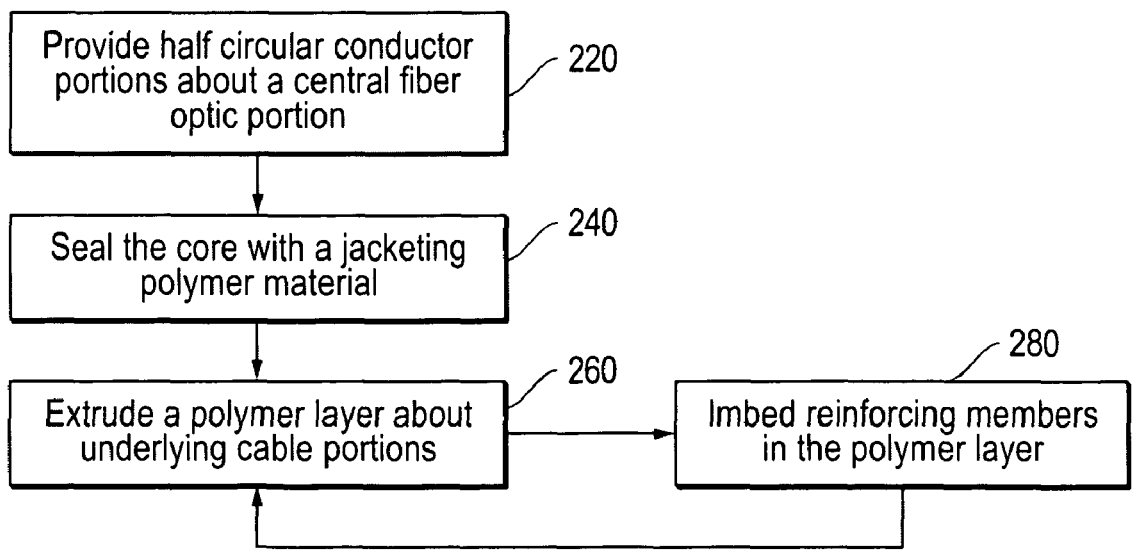
FIG. 2B is a flow-chart summarizing the method of manufacturing depicted in the schematic of FIG. 2A.

FIG. 2B summarizes the above described method of manufacture in the form of a flow-chart. Namely, as depicted at 220, half circular conductor portions are positioned about a central fiber optic portion which is then sealed with a jacketing material as noted at 240. Subsequently, intervening layers of polymer and reinforcing members such as conventional armor wire may be provided as indicated at 260 and 280. As noted, the reinforcing members may be at least partially imbedded into the underlying polymer layer. This may be achieved by the use of an infrared or other appropriate heat source applied to the polymer layer. Furthermore, the extrusion and imbedding process may be repeated until a cable of sufficient layering and reinforcement is provided.

Figure 3:
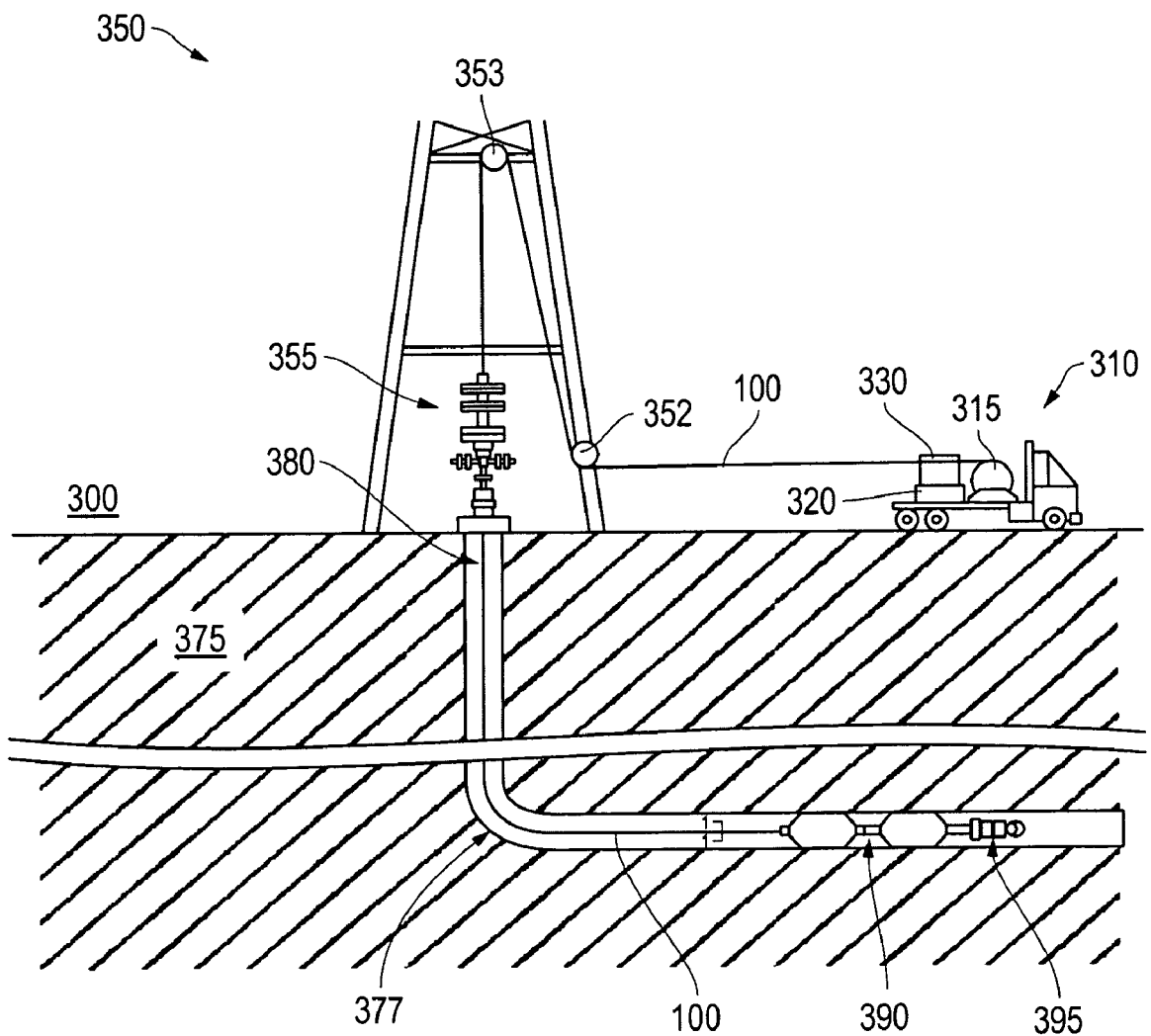
FIG. 3 is an overview of an oilfield with a well of extended reach and deviation accommodating the dual conductor fiber optic cable of FIG. 1.

Referring now to FIG. 3, a practical employment of the dual conductor fiber optic cable 100 is depicted. That is, the cable 100 is shown within a well 380 of extended reach and deviation at an oilfield 300. For example, the well 380 runs through a formation 375 in excess of 30,000 feet and, as shown, terminates at a horizontal section for access by the cable 100 and certain electrically powered downhole tools 390, 395. Nevertheless, sufficient powering and communicative capacities may be provided between certain surface equipment 320, 330 and the tools 390, 395 via the cable 100.

Continuing with reference to FIG. 3, the cable 100 is delivered to the oilfield 300 by way of a conventional wireline truck 310. The truck 310 supports a wireline reel 315 of the cable 100 along with power 320 and communicative 330 equipment for directing and running the downhole operation in the well 380. Thus, a mobile manner of cable 100 and equipment delivery is provided. Alternatively, however, the equipment 320 may be of more permanent positioning already at the oilfield 300.

A rig 350 supporting upper 353 and lower 352 sheaves is provided at the wellsite. Additionally, valve and pressure regulation equipment 355, often referred to as a 'Christmas tree', is positioned directly over the well 380. Thus, the cable 100 may be strung through the sheaves 352, 353 and directed through the regulation equipment 355 and into the well 380. Sufficiently powered, communicative tools 390, 395 may then be directed through the extreme depths and deviations of the well 380. For example, the depicted tools 390, 395 include a downhole tractor 390 which may be configured to draw power from power equipment 320 at the oilfield 300 through the cable 100.

In spite of the power equipment 320 being in excess of 30,000 feet from the tractor 390, sufficient power may be supplied over the narrow cable 100 to allow tractoring past a bend 377 and through the horizontal well section shown. In one embodiment, the cable 100 may be no more than about 0.5 inches in diameter, preferably no more than about 0.25 inches in diameter. Nevertheless, over about 0.5 kW, may be made available to the tractor 390 in this manner. Indeed, as indicated above, over 1 kW may be made available over the cable 100 in this manner. Furthermore, information obtained by diagnostic equipment 395 may be communicatively conveyed over the cable 100 in real time to central processing communicative equipment 330 at the oilfield 300. Indeed, in response to this information, or en lieu thereof, all of the downhole equipment 390, 395 may be communicatively directed and/or re-directed based on control signals sent over the cable 100 from the communicative equipment 330. With the availability of the dual conductor fiber optic cable 100 as detailed hereinabove, such downhole applications may now be effectively run at extensive depths of a deviated nature.

Figure 4:
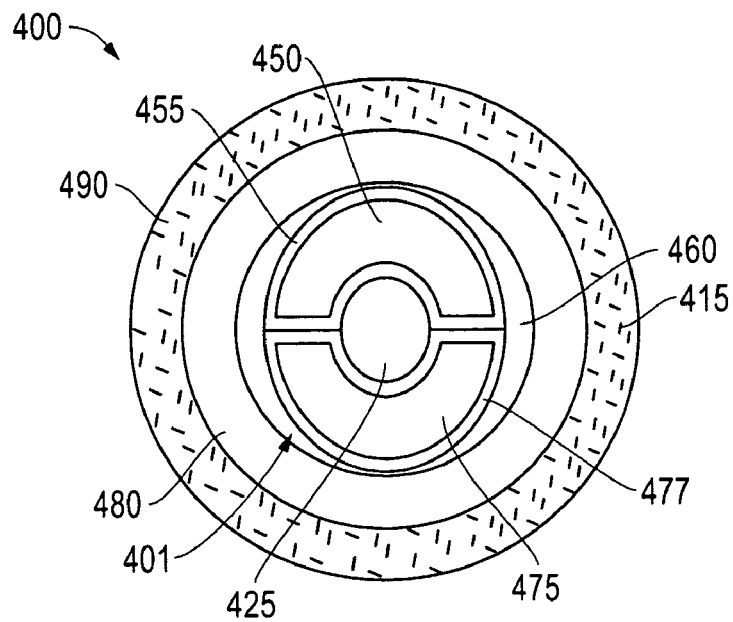
FIG. 4 is a side cross-sectional view of an embodiment of a dual conductor fiber optic cable.

Referring now to FIG. 4, a cross-sectional view of an embodiment of a dual conductor fiber optic cable 400 is shown. In this embodiment, the core 401 is still made up of forward 450 and return 475 conductor portions about a central fiber optic portion 425. However, in this embodiment, the conductor portions 450, 475 are made up of conductive metal that is of a more half circular morphology prior to the addition of insulated encasings 455, 477. For example, copper wire is often commercially available in this manner. However, upon the addition of uniform insulated encasings 455, 477, the core 401 initially takes on a more oval profile (e.g. due to the added distance (d) between the conductor portions 450, 475 (see FIG. 1)). The resulting oval profile may be overcome by utilization of conductor portions 450, 475 that are less than half circle, such as the truncated or 'short arc' conductor portions 150, 175 depicted in FIG. 1. However, alternative measures as described below, may also be employed.

In order to return circularity to the interior of the cable 400, the inner polymeric layer 460, may be particularly shaped as it is provided about the core 401. For example, during extrusion, the inner polymeric layer 460 may be configured to be of greater thickness near the interface of the conductor portions 450, 475 and thinner in other areas. Thus, more efficient manufacturing techniques may resume when subsequent layers 480, 490 of the cable 400 are provided. Indeed, as depicted, the intermediate polymeric layer 480 and the outer polymeric layer 490 appear to be of roughly uniform circularity. Further, in the embodiment shown, the outer polymeric layer 490 alone incorporates reinforcing fibers 415 as detailed above. However, a variety of reinforcing configurations may be employed.

Figure 5:
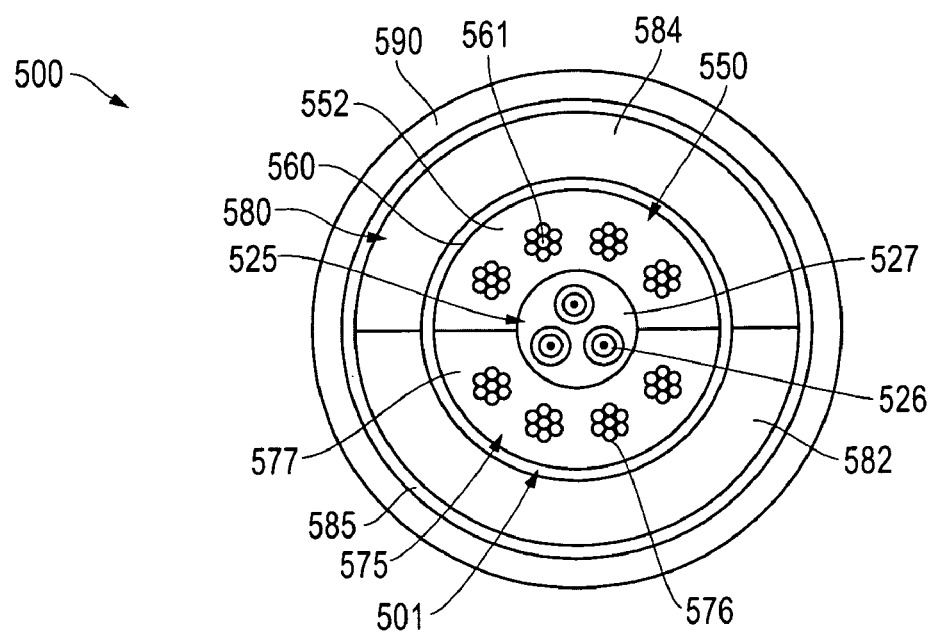
FIG. 5 is a side cross-sectional view of another embodiment of a dual conductor fiber optic cable.

Referring now to FIG. 5, a cross sectional view of a different embodiment of a dual conductor fiber optic cable 500 is depicted. In this embodiment, the central fiber optic portion 525 is made up of separate fiber optic bundles 526 in a soft polymer media 527 such as silicone. That is, as opposed to a unitary strand of fiber optic, separate bundles 526 may be employed. Given that fiber optic communications may not be as volumetrically dependent, such an embodiment may be advantageous for applications where a host of segregated data transmissions over the cable 500 are of import.

Continuing with reference to FIG. 5, the conductor portions 550, 575 are similarly made up of independent forward 561 and return 576 conductor bundles disposed in an electrically insulating polymer media 552, 577. So, for example where independently powering of downhole tools and/or components thereof are of added import, such an embodiment may be particularly advantageous.

A thin polymeric layer 560, such as of conventional polymeric tape, may be provided about the conductor portions 550, 575 in order to provide circular and stable uniformity to the core 501. The layer 560 may be a fluoropolymer, polyolefin, polyarylether ketone, or a polyphenylene. In the case of polymeric tape, pure or composite polymeric materials may be employed. The composite materials may be reinforced by fibers of glass, aramid, carbon, or other suitable material.

The embodiment of FIG. 5 is configured to be of enhanced durability. Thus, once a core 501 of uniform circularity is stabilized, polymeric shells 582, 584 may be placed thereover. In the embodiment shown, the shells 582, 584 may be of a suitable polymer matrix material such as a polyolefin, a polyarylether ketone, a fluoropolymer, a polyphenylene, or an epoxy. In the case of an epoxy, a high temperature crosslinked variety may be employed. Furthermore, the shells 582, 584 may be pultruded with fibers throughout. The fibers may be of carbon, glass, aramid or other suitable material.

Once the shells are provided, a thin polymeric layer 585, may be provided thereabout. This layer 585 may be of a polymeric tape variety similar to that detailed above and of the same material type. In the embodiment of FIG. 5, an outermost metal based layer 590 may then be provided to the cable 500. This layer 590 may be an austenitic nickel-chromium-based superalloy to provide an enhanced level of durability to the cable 500.

Embodiments of power data cables for use in hydrocarbon wells of extreme depths and deviation are detailed hereinabove. Challenges to telemetry and powering capacity for such cables posed by such wells are overcome without reliance on drill pipe or other disadvantageous cable deployment techniques. Rather, the cables detailed herein are of sufficiently narrow and lightweight configurations that may nevertheless effectively achieve well depths in excess of 30,000 feet while providing power substantially in excess of 0.5 kW to such depths.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, in addition to features of the cable detailed above, the utilization of fiber optic communications may allow for vital sign diagnostics to be performed relative to the well over the entire length of the cable during its deployment. In another example, separate conductor half-circular portions of the core may be allowed to couple and serve as a single forward or return path and the core outfitted with another circumferential conductor portion, perhaps of a plurality of individual copper rods, to serve as the other of the forward and return paths. Furthermore, the foregoing description should not be read as pertaining only to the precise structures described and shown in the accompanying drawings, but rather should be read as consistent with and as support for the following claims, which are to have their fullest and fairest scope.

We claim:

1. A hydrocarbon application cable comprising:
   a central fiber optic portion;
   a forward power conductor portion adjacent a first side of said fiber optic portion; and
   a return power conductor portion adjacent an opposite side of said fiber optic portion, wherein said conductor portions are of an arcuate morphology that is one of half-circular and truncated circular.

2. The hydrocarbon application cable of claim 1 wherein said central fiber optic portion is one of a unitary fiber and fiber optic bundles.

3. The hydrocarbon application cable of claim 2 wherein the fiber optic bundles are suspended in a silicone polymer media of said fiber optic portion.

4. The hydrocarbon application cable of claim 1 further comprising electrically insulating encasings about said conductor portions.

5. The hydrocarbon application cable of claim 4 wherein said electrically insulating encasings include a material selected from a group consisting of a fluoropolymer, a polyolefin, a polyarylether ketone, a polyphenylene, and an elastomer.

6. The hydrocarbon application cable of claim 4 wherein said electrically insulating encasings are configured to define a distance between said conductor portions at interfaces thereof.

7. The hydrocarbon application cable of claim 4 further comprising a fluoropolymer jacketing layer about said electrically insulating encasings and conductor portions.

8. The hydrocarbon application cable of claim 7 wherein said fluoropolymer is a modified ethylene-tetrafluoroethylene.

9. The hydrocarbon application cable of claim 1 further comprising electrically insulating encasings about said conductor portions, the half-circular morphology providing an oval character to said encased conductor portions when interfacing about said central fiber optic portion.

10. The hydrocarbon application cable of claim 9 further comprising a polymeric layer of non-uniform thickness about said encased conductor portions to induce circularity into the cable.

11. The hydrocarbon application cable of claim 10 wherein said polymeric layer is of greater thickness adjacent the interfacing.

12. The hydrocarbon application cable of claim 1 further comprising a polymeric layer about said conductor portions, said polymeric layer of a material selected from a group consisting of a polyolefin, a fluoropolymer, a polyphenylene, and an epoxy.

13. The hydrocarbon application cable of claim 12 further comprising armor wire embedded about said polymeric layer.

14. The hydrocarbon application cable of claim 12 wherein said polymeric layer further comprises one of reinforcing fibers and micron sized reinforcing additives.

15. The hydrocarbon application cable of claim 1 further comprising polymeric shells about said conductor portions, said polymeric shells of a material selected from a group consisting of a polyolefin, a polyarylether ketone, a fluoropolymer, a polyphenylene, and an epoxy.

16. The hydrocarbon application cable of claim 15 wherein said polymeric shells are reinforced by fibers that are one of carbon, glass, and an aramid.

17. The hydrocarbon application cable of claim 15 further comprising a polymeric tape about said polymeric shells, said polymeric tape being one of a fluoropolymer, a polyolefin, a polyarylether ketone, and a polyphenylene.

18. The hydrocarbon application cable of claim 17 further comprising an outer layer of austenitic nickel-chromium-based superalloy about said polymeric tape.

19. The hydrocarbon application cable of claim 1 wherein said conductor portions are configured of one of unitary copper and bundles of conductors.

20. The hydrocarbon application cable of claim 19 further comprising a polymeric tape about the bundles of conductors, said polymeric tape being of a material selected from a group consisting of a fluoropolymer, a polyolefin, a polyarylether ketone, and a polyphenylene.

21. A cable assembly for a hydrocarbon application, the assembly comprising:
    a hydrocarbon application cable with a central fiber optic portion for telemetry surrounded by semi-circular forward and return conductor portions for power; and
    a downhole tool coupled to said hydrocarbon application cable for positioning downhole in a well.

22. The cable assembly of claim 21 wherein said hydrocarbon application cable is in excess of about 30,000 feet.

23. The cable assembly of claim 21 wherein said hydrocarbon application cable is less than about 0.5 inches in diameter.

24. The cable assembly of claim 21 wherein the well is of a pressure of more than about 5,000 psi and said hydrocarbon application cable is sufficiently sealed for exposure thereto.

25. The cable assembly of claim 21 wherein the fiber optic portion is configured to provide well diagnostic information throughout a length of said hydrocarbon application cable.

26. The cable assembly of claim 21 wherein the power is in excess of about 0.5 kW and said downhole tool is a tractor.

* * * * *